United States Patent
Balanica et al.

(10) Patent No.: US 10,549,349 B2
(45) Date of Patent: Feb. 4, 2020

(54) METHOD AND APPARATUS FOR CONTROLLING A 3D-PRINTING DEVICE AND 3D-PRINTING DEVICE

(71) Applicant: Siemens Aktiengesellschaft, Munich (DE)

(72) Inventors: Victor Balanica, München (DE); Felix Buggenthin, München (DE); Siegmund Düll, München (DE); Mitchell Joblin, Erlangen (DE); Clemens Otte, München (DE); Axel Reitinger, München (DE); Michael Caelers, Norrköping (SE); Jonas Eriksson, Finspong (SE); Jerry Fornander, Finspang (SE); Andreas Graichen, Norrköping (SE); Yi Huang, Markt Schwaben (DE); Vincent Sidenvall, Finspang (SE); Sunil Viswanathan, Cypress, CA (US)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/719,082

(22) Filed: Sep. 28, 2017

(65) Prior Publication Data

US 2019/0091770 A1    Mar. 28, 2019

(51) Int. Cl.
| | | |
|---|---|---|
| *B22F 3/105* | (2006.01) | |
| *G05B 19/4099* | (2006.01) | |
| *B33Y 30/00* | (2015.01) | |
| *B33Y 50/02* | (2015.01) | |

(52) U.S. Cl.
CPC ............ *B22F 3/1055* (2013.01); *B33Y 30/00* (2014.12); *B33Y 50/02* (2014.12); *G05B 19/4099* (2013.01); *B22F 2003/1057* (2013.01); *G05B 2219/49023* (2013.01)

(58) Field of Classification Search
CPC ........ B22F 3/1055; B33Y 30/00; B33Y 50/02
See application file for complete search history.

(56) References Cited

U.S. PATENT DOCUMENTS

| | | | | |
|---|---|---|---|---|
| 2012/0136755 A1* | 5/2012 | Yang | ................... | G06Q 30/0601 705/26.61 |
| 2014/0222859 A1* | 8/2014 | Rathod | ............. | G06F 17/30424 707/769 |
| 2015/0057784 A1* | 2/2015 | Butler | ................. | B29C 67/0088 700/119 |
| 2015/0331402 A1* | 11/2015 | Lin | ...................... | G06F 17/5009 700/119 |
| 2016/0048609 A1* | 2/2016 | Voris | ....................... | G06F 17/50 700/98 |

\* cited by examiner

*Primary Examiner* — Vincent H Tran

(74) *Attorney, Agent, or Firm* — Schmeiser, Olsen & Watts LLP

(57) ABSTRACT

The present invention provides an enhanced setup of a 3D-printing device, especially to a laser powder bed fusion 3D-printing device. It is for this purpose, that data relating to previously printed products are stored in a database. When a new product is to be printed, the features of the new product are matched with features of previously printed products stored in the database. Accordingly, a suggestion for setting-up the 3D-printing device based on corresponding previously printed products and their setup parameters can be automatically determined and applied to the 3D-printing device.

12 Claims, 1 Drawing Sheet

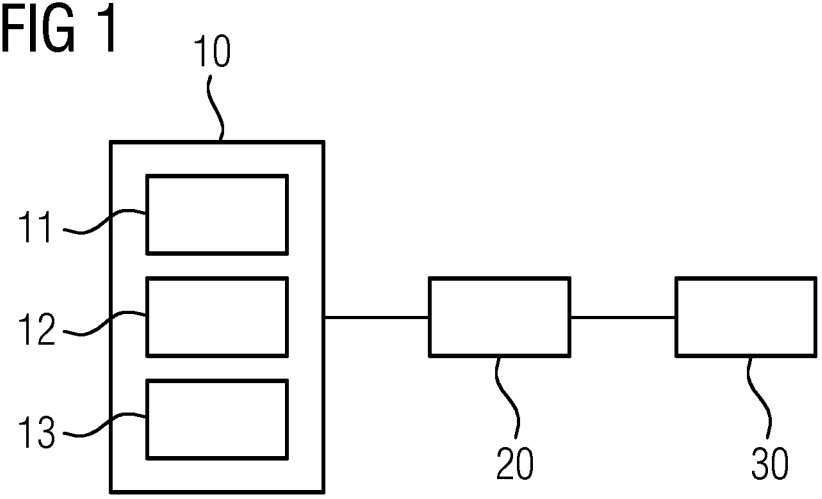
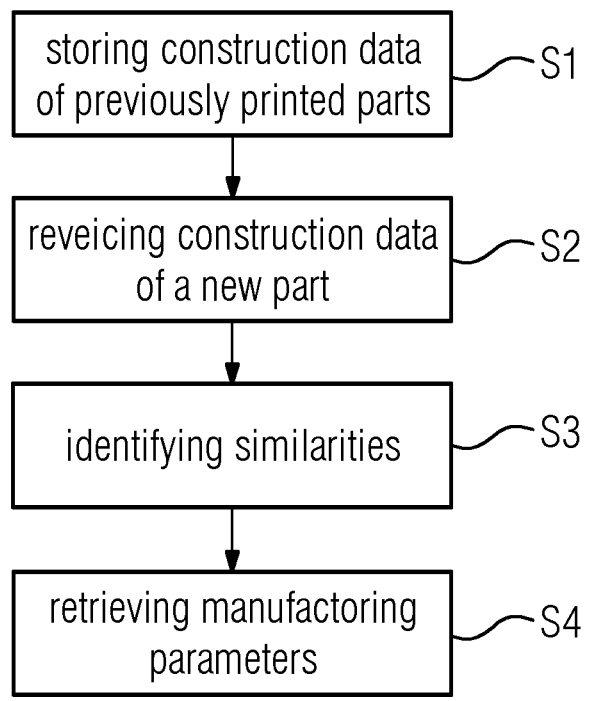

METHOD AND APPARATUS FOR CONTROLLING A 3D-PRINTING DEVICE AND 3D-PRINTING DEVICE

TECHNICAL FIELD

The present invention relates to a method and an apparatus for controlling a 3D-printing device. The present invention further relates to a 3D-printing device.

BACKGROUND

Although applicable in principle to any 3D-printing device, the present invention and its underlying problem will be hereinafter described in combination with a laser powdered bed fusion printing device.

Laser powdered bed fusion (LPS) enables the manufacturing of metal parts by laser-wise selective melting of metal powder which is also commonly known as a 3D-printing. In order to correctly print a product, a complex parametrization and configuration has to be carried out. For example, the position of the product on a base plate, the orientation and the relative position of the product to further parts may have impact to the result of a print job. A design engineer may optimize the mentioned properties together with multiple further parameters of a print job based on his experience. However, even experienced engineers usually have to perform several test prints in order to optimize the result. This generates additional costs and occupies the printing device that otherwise might be used productively.

Against this background, a problem addressed by the present invention is to provide a simplified process for determining optimized parameters for setting up a 3D-printing device.

SUMMARY

The present invention solves this problem with an apparatus for controlling a 3D-printing device according to features of claim 1, a 3D-printing device with the features of claim 8, and a method for controlling a 3D-printing device according to the features of claim 10.

In a first aspect, an apparatus for controlling a 3D-printing device is provided, the apparatus comprises a database, a data analyzer and a configurator. The database is adapted to store construction data of previously manufactured products and manufacturing parameters related to the previously manufactured products. The data analyzer is adapted to receive construction data of a product to be manufactured. Further, the analyzer is adapted to identify similarities between the construction data of the product to be manufactured and construction data of previously manufactured products stored in the database. The configurator is adapted to retrieve from the database manufacturing parameters of products having a similarity with the product to be manufactured. The configurator is further adapted to determine setup parameters for the product to be manufactured based on the retrieved manufacturing parameters.

In a second aspect, a method for controlling a 3D-printing device is provided. The method comprises a step of storing construction data of previously manufactured products and manufacturing parameters related to the previously manufactured products in a database. The method comprises further a step of receiving construction data of a product to be manufactured and a step of identifying similarities between the construction data of the product to be manufactured and the construction data of previously manufactured products stored in the database. The method further comprises a step of retrieving, from the database, manufacturing parameters of products having a predetermined similarity with the product to be manufactured, and a step of determining setup parameters for the product to be manufactured based on the retrieved manufacturing parameters.

The present invention takes into account that the determination of appropriate manufacturing parameters for printing a product with a 3D-printing device is a challenging task. Usually an engineer requires multiple test printing tasks for achieving an optimal result. This increases the costs for printing the product, and the printing device is occupied for a long time period due to the multiple test printings.

Accordingly, the present invention aims to speed-up the process for determining optimal parameters for printing a three-dimensional product. In particular, the present invention aims to provide an automated process for determining improved parameters for printing a three-dimensional product and therefore, the present invention can provide an improved process for setting-up the 3D-printing device and achieving optimized results when printing a three-dimensional product.

It is for this purpose that the knowledge about previous printing processes is collected in a database, and this knowledge can be taken into account when determining optimized parameters for printing a new three-dimensional product. The data stored in such a database may be considered as a knowledge database which can be used for computing suggestions for optimized parameters which can be used for setting-up a three-dimensional printing process for a product. According, the experience of former printing processes can be used in order to determine automatically appropriate parameters for new printing processes. In this way, the determination of the parameters for setting-up a 3D-printing device can be automated without the need of the experience of a highly qualified engineer, and especially without the need of a number of test printings for an appropriate result can be achieved. Hence, the time and costs which are needed for printing a three-dimensional product with a desired quality can be minimized. Furthermore, the quality of the printed product by the three-dimensional printing process can be improved.

To determine similarities between a new product which is desired to be produced, and products which have been formally produced, any kind of matching between the formally produced products and the desired new product can be applied. For example, it is possible to analyze the construction data of the new product which is desired to be printed in order to identify particular features, especially predetermined features. If one or more of such features are determined in the construction data of the product which is to be printed, then it can be searched for these features in the construction data of the previously printed products in the database. If a correspondence between features in the product to be manufactured and the previously manufactured products is found, then it is very likely that the same or similar manufacturing parameters which are used for printing the previously produced product may be also appropriate for printing the desired new product. Accordingly, the parameters for setting-up the printing device which have been used for printing a previous product with same or similar features than the product which is to be manufactured may be applied for printing the new product. In this way, the experience of the printing process of previously printed products can be used for automatically determining an optimized set of parameters for printing a new product.

In this way, the process for determining optimized manufacturing parameters can be accelerated and the result of the printing process may be improved based on the applied printing parameters.

It is understood that each kind of features may be used for comparing the product to be manufactured with the previously manufactured products. For example, it may be possible to compare the size of products, the outer shape of the products, particular features, like a shape of corners or edges of the products, the structure of the products, e.g. similar elements with a similar shape like struts, spherical elements, or any kind of functional elements which are specified by the construction data of the products. By comparing or matching the features between the product to be manufactured as the previously manufactured products, it may be possible to specify for each product stored in the database a degree of similarity. Accordingly, products having a similarity with the product to be manufactured may be easily identified. Further to this, it may be also possible to use manufacturing parameters from a plurality of previously produced products depending on the respective features of these previously manufactured products. For example, if a plurality of first features is identified in the product to be printed, the parameters for printing these first features may be used from a first previously produced product. Further, if there is a further previously produced product having second features which are similar to second features of the product which is desired to be printed, the manufacturing parameters for printing the second features may be used based on this further previously produced product.

The construction data may be any kind of data which are appropriate for specifying the product to be manufactured. For example, the construction data may comprise data of a computer aided design (CAD) system. However, it is understood that any other kind of data for specifying the properties of the product to be manufactured may be possible, too.

The process for determining the setup parameters for setting-up the 3D-printing device based on the manufacturing parameters of previously produced products may use, for example, the corresponding setup parameters of the previously produced products. Accordingly, the same setup parameters may be applied for producing the new product. However, it may be also possible to use the manufacturing parameters of the previously produced products and to adapt these parameters depending on the properties of the product which is to be produced. For example, parameters may be adapted in order to acknowledge a scaling between the previously produced product and the desired new product or to acknowledge any further differences between the previously produced products and the desired new product.

In a possible embodiment, the manufacturing parameters may comprise setup parameters of the 3D-printing device, an orientation of the product in the 3D-printing device, a specification of raw materials used for printing the product, parameters specifying the result of the manufactured product, a time period which is required for manufacturing the product, the total costs which are required for manufacturing the product, and/or any other appropriate parameters specifying the setup of the printing device, the result or properties of the printed product or any further data related with the printed product. Accordingly, a comprehensive knowledge database related with the products may be obtained. In this way, it may be possible to consider not only the parameters for setting-up the 3D-printing device, but also further information, in particular information about the result which can be achieved when applying the respective setup of the printing device. Accordingly, it may be possible to obtain a forecast of the expected result when printing a product based on setup parameters which have been already used before.

Accordingly, the setup parameters for setting-up the printing device in order to print a desired new product may comprise, for example, parameters such as a required raw material, a printing speed, an orientation of the product in the printer, especially an arrangement of multiple products when printing multiple products simultaneously, or any further parameters for setting-up the printing device. For example, when a laser powdered bed fusion technique is applied, it may be also possible to specify an intensity of a laser for melting metal powder or any further appropriate setup parameter.

In a possible embodiment, the manufacturing parameters which are stored in the database may further comprise a release version of the manufacturing parameters and/or a history of amendments applied to the manufacturing parameters of a product. For example, the database may store multiple versions of manufacturing parameters which have been applied before when printing a product. Accordingly, by referring to the manufacturing parameters and the applied modifications to the manufacturing parameters in successively applied printing processes, it may be possible to evaluate the impact of the amendments to the result of the printing process. Accordingly, it may be possible to estimate an impact when changing one or more of the manufacturing parameters in the printing process. Especially, it may be possible to evaluate an optimal setup of the printing device for achieving a desired result by analyzing the previously applied parameters and the result of the respective printing process.

In a possible embodiment, the database for storing the construction data and the manufacturing parameters may be a database of a product lifetime management system. Such a product lifetime management system may be, for example, a system like Siemens Teamcenter or any other appropriate product lifetime management system.

In a possible embodiment, the configurator is adapted to modify the determined setup parameters based on the received construction data and/or a user input. For example, the configurator may compare the construction data of a product to be manufactured with the construction data of previously produced products and adapt the setup parameters based on differences between the desired new product and the previously produced products, which provide the respective manufacturing parameters. Accordingly, the setup parameter may be adapted to the desired new product more precisely. Further, it may be also possible that a user provides further input in order to adapt the setup parameters. Especially, the user may input further constraints or suggestions in order to modify the automatically determined setup parameters before starting the printing process.

In a possible embodiment, the apparatus for controlling the 3D-printing device may comprise a data acquisition unit for acquiring manufacturing parameters of previously manufactured products. The data acquisition unit may store the acquired manufacturing parameters in association with the construction data of the previously manufactured product in the database. Especially, the data acquisition unit may acquire any kind of information in association with the previously manufactured product. This information may comprise, for example a report about the result of the printed product. Especially, it may possible to specify the durability of the manufactured product, any kind of tolerances of the printed product, possible failures in the printed product, or any other kind of information which is related with the printed product. The information may be provided in digital form and therefore may be stored directly in the database. However, it may be also possible to acquire the information by printed or handwritten reports. These reports may be scanned and successively an optical character recognition may be applied to the scanned documents. However, it is understood, that any other kind of acquiring information in association with the printed product may be possible, too. For example, it may be also possible that an automated measurement of a printed product may be applied after the product has been printed. For example, a camera or a 3D-scanning system may measure the printed product, or any other kind of measurement system may acquire measurement data of a printed product. All these information may be stored together with the manufacturing parameters in the database.

In a possible embodiment, the apparatus may comprise a controller for controlling the 3D-printing based on determined setup parameters. Accordingly, the determined setup parameters may be provided automatically to the controller and thus, the printing process can be automatically performed based on optimized parameters without any manual impact. In this way, the process for printing a three-dimensional product may be improved and accelerated.

In a possible embodiment, the 3D-printing device may be a laser powder bed fusion in 3D-printing device. Such a printing device generates three-dimensional products by a laser beam which is melting metallic powder. Such 3D-printing devices usually require a very complicated setup of all required parameters. Accordingly, the automated determination of appropriate setup parameters enables to speed-up and to improve the three-dimensional process of such printers.

In a possible embodiment of the method for controlling the 3D-printing device, the step for identifying similarities may comprise identifying elements in the construction data of the products to be manufactured, which are the same or at least similar to corresponding elements in a construction data of previously manufactured products stored in the database. Accordingly, by matching elements between the product to be manufactured and previously manufactured products, it is possible to determine a degree of similarity between the products in order to identify more similar products in the database.

In a possible embodiment, the step for determining setup parameters may comprise determining a plurality of setup parameter sets. Especially, it is possible to determine not only a single set of setup parameters for setting-up the 3D-printing device, but even more than one setup parameter sets. In this way, it may be possible to specify a plurality of setup parameters having different advantages and based on this, it may be possible to select the set of setup parameters which is most appropriate for a desired application.

In a possible embodiment, the step of determining setup parameters may further comprise a ranking for each determined setup parameters. Accordingly, by evaluating a ranking for the determined setup parameter sets, it may be possible to identify a most appropriate setup parameter set.

In a possible embodiment, the method may comprise a step of controlling the 3D-printing device based on the determined setup parameters. Accordingly, a fully automated printing of a three-dimensional object based on optimized setup parameters is possible.

With the present invention, it is therefore possible to automatically obtain an optimized set of setup parameters for printing a three-dimensional object, in particular by a laser powder bed fusion technique. Especially, it is possible to take into account the experience of previous printing processes and consequently the setup of the printing device can be based on this experience. In this way, the number of test printings may be reduced, the setup of the printing device is accelerated and thus, the costs for printing the desired product are minimized. Further to this, it is possible to obtain three-dimensional printed products having a high quality.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which:

FIG. 1 shows a block diagram of an embodiment of a 3D-printing device comprising an apparatus for controlling the 3D-printing device according to the present invention; and FIG. 2 shows a flow diagram of an embodiment of a method for controlling a 3D-printing device according to the present invention.

The appended drawings are intended for providing further understanding of the embodiments of the invention. The illustrate embodiments and, in conjunction with the description, help to explain principles and concepts of the invention. Other embodiments and many of the advantages mentioned become apparent in view of the drawings. The elements in the drawings are not necessary shown in scale.

DETAILED DESCRIPTION OF THE DRAWINGS

FIG. 1 shows a block diagram of an embodiment of a 3D-printing device 1. The 3D-printing device may comprise a 3D-printer 30. For example, the 3D-printer 30 may be a laser powdered bed fusion (LPS) printer which enables manufacturing of metal parts by laser-wise selective melting of metal powder. However, it is understood that any other technique for three-dimensional printing may be also applied. Especially, the 3D-printer 30 may be a printer applying selective laser sintering, electron beam melting, electron beam additive manufacturing, fused filament fabrication, fused deposition modeling, stereo lithography, multi jet modeling or film transfer imaging. Furthermore, any other appropriate technique for performing a three-dimensional printing may be possible, too.

The 3D-printer may be controlled by a controller 20. The controller 20 may be a separate part as shown in FIG. 1, or the controller 20 may be employed in the 3D-printer or in the apparatus 10 for configuring the 3D-printing device 1 which will be described below. For example, the controller 20 may be applied as a processor which may receive construction data of a part to be printed. Based on the received construction data, for example 3D data, the controller 20 may generate signals for driving the respective components of the 3D-printer 30. Especially, the controller 20 may generate analogue or digital signals which may be applied to the 3D-printer 30 in order to move elements of the 3D printer 30 into a particular direction, to activate a print head, to control a laser beam or to perform any other desired operation of the 3D printer 30.

For performing a desired three-dimensional printing operation, the 3D-printer 30, and if necessary the controller 20, have to be provided with appropriate setup parameters in order to setup the 3D-printing device 1 according to the desired printing job. Even though the present invention is not limited to LPS printing, the setup of the printing device 1 will be explained in the following based on parameters for setting-up a LPS printer. However, it is understood, that an appropriate setup for a three-dimensional printer applying another technique may be performed accordingly.

For example, it might be necessary to specify for a desired printing job of a LPS printer, to determine an appropriate metal powder which can be used for printed a desired part. Accordingly, an intensity of the laser beam which is used for the printing operation, a diameter of the laser beam, a pulse frequency of the laser pulses used for printing or any other parameters of the laser beam which may be setup accordingly can be specified. Further, the orientation of the part which shall be printed on the printing plate may be determined. For example, the result of the printing operation may depend on a translational or rotatory orientation of the part on the printing plate. If more than one part shall be printed simultaneously, the position of the individual parts on the printing plate may be also specified. However, it is understood that the before-mentioned parameters shall be only some examples of setup parameters for the 3D-printing device and any further parameter for setting-up the printing device may be also specified.

In the following, the automated determination of setup parameters for the 3D-printing device 1 by the apparatus 10 for configuring the 3D-printing device 1 will be described. The apparatus 1 for configuring the 3D-printing device may comprise a database 11, a data analyzer 12 and a configurator 13.

The database 11 may store any kind of information related with previously printed parts. For this purpose, the database 11 may be any kind of appropriate data management system for collecting and storing data related with previously printed parts. For example, database 11 may be a database of a product lifetime management (PLM) system. Especially, the data of the previously printed parts may be stored in a PLM system such as Siemens Teamcenter. However, it is understood, that the database 11 of the apparatus 10 for configuring the 3D-printing device 1 is not limited to such a PLM system. Moreover, any other kind of database for storing the required information may be possible, too.

The parts which have been previously printed may be characterized in database 11, for example, by the respective construction data of the individual parts. For example, CAD data may be used for characterizing the individual parts. However, any other kind of information for characterizing the shape or particular functional properties of the parts may be also possible. In particular, the previously printed parts may be characterized by a particular shape of outer surface or particular functional properties. For example, each part may be characterized by its edges, corners, outer curves or any other particular characterizing feature. Furthermore, additional parameters relating to the part may be stored together with the above described characterizing properties, especially the construction data of the previously manufactured parts. The additional parameters may comprise, for example, the setup parameters which have been used for setting-up the 3D-printer 30 when printing the respective part. Accordingly, the manufacturing parameters may comprise some or all of the above described parameters for setting-up the 3D-printer 30.

Furthermore, any other kind of information related with a previously printed part may be also stored in the database 11. For example, it may be further stored in database 11 any kind of information related with the result of the printing job when the previously printed part has been printed. For example, this additional information may characterize the result of the printing operation when applying the respective setup parameters specified in the database 11. This information may comprise, for example, tolerances, i.e. deviation between the result of the printed product and the desired specification, strength or stability of the printed part, surface quality or surface texture of the printed part, weight of the part, time and/or costs for printing the part, or any other properties of the printed part. These features or at least some of these features may be determined after the printing of the part has been finished. For example, the part may be measured automatically by an appropriate measurement system for determining at least some of the above-mentioned specifications. For example, the part may be analyzed by a camera or a camera system, a laser scanner or any other test system for measuring the part after the printing job has been finished. However, it is understood that at least some of the features may be also determined by a manual or semi-manual measurement of a part by a user.

Furthermore, it may be also possible to acquire additional information of a previously printed part during the lifetime of the part. Accordingly, any further additional information related to the previously printed part may be added to the database at a later point of time. For example, a failure or abrasion of a part during a particular use of the part may be also reported to database 11. Further, it may be possible to specify in database 11 the current use of the part, for example at which position of a system the part is applied, whether or not the printed part is still in use, or any other information about the lifetime or the end of the lifetime of the previously printed part. However, it is understood that the data stored in database 11 is not limited to the above described information. Moreover, any other kind of information related with the previously printed part may be also collected in database 11.

The information related to a previously printed part, which is stored in database 11 may be provided to database 11 in any appropriate format and scheme. For example, a previously printed part may be automatically measured by an automated system and the acquired measurements may be provided to database 11 by an appropriate interface. If necessary, analogue measurements may be converted in digital data by means of an analogue to digital converter. Furthermore, manually or semi-manually acquired data may be also provided to database 11 by an appropriate interface, for example by a human to machine interface. Furthermore, it is even possible to acquire printed or handwritten reports and to store these reports in database 11. If a report about a related previously printed part is available in digital form, this digital report may be stored in database 11. If a report is available, for example, only in paper form, the respective documents may be scanned, and the scanned documents may be stored in database 11. Furthermore, it may be possible to perform an optical character recognition to acquire the information in digital form. If information related with a previously printed part is provided by a report, this report may be converted into a digital form, and successively, an appropriate algorithm, for example a text mining procedure may be applied to this report in order to extract information related to the previously printed part. For example, if there is a report reading "The part has a high quality, and the lifetime of the part is approximately ten months." an automated algorithm my extract the information about the quality and the lifetime from this text and to convert this information into a kind of information which can be used for further processing. However, it is also understood, that any other kind of acquiring information related to previously parts may be possible, too. All these information may be stored in database 11.

Furthermore, if more than one part is printed, especially when applying different setup parameters to each of the printed parts, database 11 may separately store the related information for all versions of the printed part separately. Accordingly, the impact of the different setup parameters to the different printed parts can be analyzed. Accordingly, a revision/version control may be applied to the information stored in database 11. Accordingly, the history of the modifications applied to the parameters used for printing the parts may be stored in database 11. Hence, this history of the modifications to the setup parameters is available and can be analyzed in order to determine an impact of the modifications to the printed parts.

Accordingly, when a new part shall be printed, the information stored in database 11 may be used in order to automatically determine an optimized configuration for printing a desired new part. For example, configuration data of a desired new part may be provided by data analyzer 12. The data analyzer 12 receives the data of the part to be manufactured. This data of the part to be manufactured may comprise, e.g. construction data of the part. Especially, the construction data may comprise the CAD data of the product which shall be printed. Based on the received data of the part to be printed, data analyzer 12 compares the features of the received data with features of previously printed parts which are stored in database 11. For example, data analyzer 12 may compare the outer shape of the part to be printed with the outer shape of previously printed parts stored in database 11. However, the process of comparing the parts is not limited to comparing the outer surface. Moreover, a part may be separated into a number of elements, and for each of these elements it may separately searched in database 11 to identify corresponding previously printed parts. For example, if a part to be printed has a part having a rounding with a particular diameter, it may be searched in database 11 for corresponding previously printed parts having similar properties. Accordingly, edges, corners or any kind of functional elements of the part to be printed may be identified and it may be searched for corresponding features of previously printed parts. Accordingly, it may be possible to identify one or more previously printed parts in database 11 which have same or at least similar features corresponding to respective features of the part to be printed.

After one or more previously printed parts have been found in database 11 which have same or similar features of the part to be printed, the corresponding setup parameters of the previously printed parts may be retrieved from database 11. Accordingly, it is possible to determine setup parameters for the part to be printed based on the corresponding setup parameters of the previously printed part matching the features of the part to be printed. Hence, the setup parameters for printing the desired new part, the corresponding setup parameters of the previously printed parts may be used as reference. Especially, if a part is separated into multiple elements and for each of these elements another previously printed part has been found which has corresponding features, the respective different setup parameters may be applied for printing the individual elements of the new part. However, if it is not possible to change the setup parameters during the printing process, it may be also possible to compute an appropriate setup for printing the desired part based on the different setup parameters of the previously printed parts which have corresponding features. However, it is understood that any other scheme for determining setup parameters based on the setup parameters of previously printed parts which have corresponding features may be also possible.

Furthermore, it may be possible to analyze the additional information stored in association with the previously printed parts in database 11. For example, it may be possible to evaluate the results of the previously printed parts by analyzing the additional information stored in association with the previously printed parts in database 11. Especially, if same or similar parts are stored in database 11, wherein different setup parameters are applied, the respective results of the printing process may be analyzed in order to determine an optimal setup. Especially, the optimal setup may be different depending on a desired purpose of the part to be printed. For example, a first setup may result to a part having a very high strength but wherein other parameters may be less good, e.g. the maximum lifetime of the part is limited. According to another setup, the lifetime of a part may be optimized, but some other parameters may be limited, e.g. a higher tolerance. Accordingly, depending on a desired purpose of a part, it may be possible to identify an optimum setup by analyzing the additional information stored in association with the previously printed parts in database 11. For this purpose, a desired purpose of a part may be provided to a data analyzer 12 in association with the construction data. In this case, the data analyzer 12 may automatically identify an optimum setup parameter by taking into consideration all available information. Furthermore, it may be also possible that data analyzer 12 forms an analysis of the desired new part which shall be printed based on the information stored in database 11, and the data analyzer 12 may provide a plurality of suggestions of setup parameters. In this case, data analyzer 12 may also identify the additional information stored in association with the previously printed parts in database 11 and provide this additional information together with the suggestion for the setup parameters. In this case, a user may refer to the suggested setup parameters and the corresponding additional information and select the appropriate setup parameter accordingly. Furthermore, the user may also perform any modifications in the suggested setup parameters before applying the setup parameters to the 3D-printer 1.

After the appropriate setup parameters for printing the desired new product have been determined, the respective setup parameter may be applied by configurator 13 in order to perform the printing process. For this purpose, the determined setup parameters may be provided to a controller 20 and controller 20 may perform the three-dimensional printing based on the provided setup parameters and the construction data of the desired new part. In this way, the process for setting-up the 3D-printing device 1 can be accelerated. Since the automatically determined parameters taking into account the result of previously printing processes, the knowledge of the previous printing processes can be used in order to identify an optimized setup of the 3D-printing device 1. Hence, the result of the printing process can be optimized and thus, the number of test prints for achieving an optimized result can be minimized. Thus, the costs and the time for obtaining a 3D-printing part having a desired quality can be significantly reduced.

FIG. 2 illustrates a flow chart of a method for configuring a 3D-printing device underlying an embodiment.

In step S1, construction data of previously manufactured parts and manufacturing parameters related to previously manufactured parts are stored in a database 11. In step S2 construction data of a part to be manufactured are received. In step S3 similarities between the construction data of the part to be manufactured and the construction data of previously manufactured part stored in database 11 are identified. In step S4 manufacturing parameters of products having a similarity with the part to be manufactured is retrieved from the database 11. Finally, in step S5 setup parameters for the part to be manufactured are determined based on the retrieved manufacturing parameters.

Furthermore, it is understood, that all the operations described above in connection with the apparatus 1 for configuring the 3D-printing device may be also applied to this method.

Summarizing, the present invention relates to an enhanced setup of a 3D-printing device, especially to a laser powder bed fusion 3D-printing device. It is for this purpose, that data relating to previously printed products are stored in a database. When a new product is to be printed, the features of the new product are matched with features of previously printed products stored in the database. Accordingly, a suggestion for setting-up the 3D-printing device based on corresponding previously printed products and their setup parameters can be automatically determined and applied to the 3D-printing device.

The invention claimed is:

1. An apparatus for controlling a 3D-printing device, comprising:
    a database adapted to store construction data of previously manufactured products and manufacturing parameters related to the previously manufactured products;
    a data analyzer adapted to receive construction data of a product to be manufactured and to identify similarities between the construction data of the product to be manufactured and the construction data of previously manufactured products stored in the database;
    a configurator adapted to retrieve, from the database, manufacturing parameters of products having a similarity with the product to be manufactured and to determine setup parameters for the product to be manufactured based on the retrieved manufacturing parameters, each of the setup parameters being ranked to identify a most appropriate setup parameter set, wherein the configurator is adapted to modify the determined setup parameters based on the received construction data or a user input.

2. The apparatus according to claim 1, wherein the manufacturing parameters comprise setup parameters of the 3D-printing device, an orientation of the product in the 3D-printing device, a specification of raw materials, parameters specifying a result of the manufactured product, a time period for manufacturing the product or costs for manufacturing the product.

3. The apparatus according to claim 1, wherein the manufacturing parameters further comprise a release version of the manufacturing parameters or a history of amendments applied to the manufacturing parameters of a product.

4. The apparatus according to claim 1, wherein the database is a database of a product lifetime management system.

5. The apparatus according to claim 1, comprising a data acquisition unit for acquiring manufacturing parameters of previously manufactured product and for storing the acquired manufacturing parameters in association is the construction data of the previously manufactured product in the database.

6. The apparatus according to according to claim 1, comprising a controller for controlling the 3D-printing device based on the determined setup parameters.

7. A 3D-printing device comprising an apparatus according to claim 1.

8. The 3D-printing device according to claim 7, wherein the 3D-printing device is laser powder bed fusion 3D-printing device.

9. A method for controlling a 3D-printing device, comprising the steps of:
    storing construction data of previously manufactured products and manufacturing parameters related to the previously manufactured products in a database;
    receiving construction data of a product to be manufactured;
    identifying similarities between the construction data of the product to be manufactured and the construction data of previously manufactured products stored in the database;
    retrieving, from the database, manufacturing parameters of products having a similarity with the product to be manufactured;
    determining setup parameters for the product to be manufactured based on the retrieved manufacturing parameters, wherein each of the setup parameters are ranked to identify a most appropriate setup parameter set; and
    modifying the determined setup parameters based on the received construction data or a user input.

10. The method according to claim 9, wherein the step for identifying similarities comprises identifying elements in the construction data of the products to be manufactured being the same or similar to corresponding elements in the construction data of a previously manufactured product stored in the database.

11. The method according to claim 9, wherein the step for determining setup parameters comprises determining a plurality of setup parameters.

12. The method according to claim 9, comprising a step of controlling the 3D-printing device based on the determined setup parameters.

* * * * *